United States Patent
Davis et al.

(10) Patent No.: US 11,035,252 B2
(45) Date of Patent: Jun. 15, 2021

(54) UNIFIED CURVED BEAM BEARING DAMPER

(71) Applicant: United Technologies Corporation, Farmington, CT (US)

(72) Inventors: Todd A. Davis, Tolland, CT (US); Russell B. Witlicki, Wethersfield, CT (US); Christopher M. Valva, Manchester, CT (US); Andrew Newton, Ellington, CT (US); David C. Kiely, Manchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 47 days.

(21) Appl. No.: 16/668,684

(22) Filed: Oct. 30, 2019

(65) Prior Publication Data
US 2021/0131307 A1    May 6, 2021

(51) Int. Cl.
| | | |
|---|---|---|
| F01D 25/16 | (2006.01) | |
| F16C 27/04 | (2006.01) | |
| F16C 19/00 | (2006.01) | |

(52) U.S. Cl.
CPC .......... F01D 25/164 (2013.01); F16C 27/045 (2013.01); *F01D 25/16* (2013.01); *F16C 19/00* (2013.01); *F16C 2360/23* (2013.01)

(58) Field of Classification Search
CPC .... F01D 25/164; F01D 25/16; F16C 2360/23; F16C 19/00
USPC ........................................................ 415/112
See application file for complete search history.

(56) References Cited

U.S. PATENT DOCUMENTS

| | | | |
|---|---|---|---|
| 4,213,661 A | 7/1980 | Marmol | |
| 4,952,076 A | 8/1990 | Wiley, III et al. | |
| 4,992,024 A | 2/1991 | Heydrich | |
| 7,052,183 B2* | 5/2006 | Chen ..................... | F16C 27/066 384/536 |
| 7,419,304 B2 | 9/2008 | Mavrosakis | |
| 8,202,003 B2 | 6/2012 | Klusman et al. | |
| 8,353,633 B2 | 1/2013 | Griffin | |
| 9,745,992 B2 | 8/2017 | Barber et al. | |
| 10,316,691 B2 | 6/2019 | Murayama | |
| 2005/0276530 A1 | 12/2005 | Chen et al. | |
| 2006/0204153 A1 | 9/2006 | Alam et al. | |
| 2011/0058759 A1* | 3/2011 | Herborth ............... | F01D 25/164 384/55 |

OTHER PUBLICATIONS

European Search Report for Application No. EP 20204416 dated Mar. 18, 2021.

* cited by examiner

*Primary Examiner* — Joseph J Dallo
*Assistant Examiner* — Yi-Kai Wang
(74) *Attorney, Agent, or Firm* — Carlson, Gaskey & Olds, P.C.

(57) ABSTRACT

A gas turbine engine component includes a ring comprising a single-piece component having an outer peripheral surface and an inner peripheral surface that surrounds an engine center axis, a plurality of outer diameter pedestals formed in the outer peripheral surface and circumferentially spaced apart from each other, and a plurality of inner diameter pedestals formed in the inner peripheral surface and circumferentially spaced apart from each other. A plurality of recesses are formed in the outer peripheral surface and are circumferentially spaced apart from each other.

20 Claims, 3 Drawing Sheets

UNIFIED CURVED BEAM BEARING DAMPER

STATEMENT REGARDING FEDERALLY SPONSORED RESEARCH OR DEVELOPMENT

This invention was made with Government support awarded by the United States. The Government has certain rights in this invention.

BACKGROUND

This application relates to a gas turbine engine that includes a curved beam bearing damper that is comprised of a single-piece ring.

Gas turbine engines are known and typically include a fan delivering air into a bypass duct as bypass air and into a compressor as core air. The air is compressed and delivered into a combustor section where the air is mixed with fuel and ignited. Products of the combustion pass downstream over turbine rotors, which causes the turbine rotors to rotate.

Gas turbine engines require specific support stiffnesses and/or oil feed dampers to manage vibrations of rotating and static structures at specific operating speeds. In one configuration, a centering spring is used in combination with an oil damper that is positioned between a bearing outer race and a static engine structure. The oil damper comprises an oil squeeze film damper made from a plurality of segments that are mounted directly between the outer race and the engine static structure. The centering spring extends axially away from one end of the film damper to a distal end that is fixed to the static engine structure. While this configuration is effective at managing vibrations, a significant amount of axial space is consumed by the centering spring and damper. Additionally, the centering spring and damper are expensive and complicated to machine due to the large number of tightly controlled surfaces to manage stress and stiffness for a given amount of deflection.

Curved beam dampers can also be used to dampen vibrations. The curved beam is formed from a plurality of individual segments. However, this configuration is not conducive for providing an effective and reliable oil film damper.

SUMMARY

In a featured embodiment, a gas turbine engine component includes a ring comprising a single-piece component having an outer peripheral surface and an inner peripheral surface that surrounds an engine center axis, a plurality of outer diameter pedestals formed in the outer peripheral surface and circumferentially spaced apart from each other, and a plurality of inner diameter pedestals formed in the inner peripheral surface and circumferentially spaced apart from each other. A plurality of recesses are formed in the outer peripheral surface and are circumferentially spaced apart from each other.

In another embodiment according to the previous embodiment, the plurality of recesses alternate with the plurality of outer diameter pedestals circumferentially about the engine center axis.

In another embodiment according to any of the previous embodiments, the plurality of outer diameter pedestals are circumferentially offset from the plurality of inner diameter pedestals.

In another embodiment according to any of the previous embodiments, each inner diameter pedestal is radially aligned with a corresponding one of the plurality of recesses.

In another embodiment according to any of the previous embodiments, the ring has an axial width that extends from an upstream end to a downstream end, and including a first groove formed in the outer peripheral surface at the upstream end and a second groove formed in the outer peripheral surface at the downstream end.

In another embodiment according to any of the previous embodiments, a first seal or piston ring is in the first groove and a second seal or piston ring is in the second groove.

In another embodiment according to any of the previous embodiments, the ring has a radial thickness extending from the inner peripheral surface to the outer peripheral surface, and wherein the radial thickness varies circumferentially about the engine center axis.

In another embodiment according to any of the previous embodiments, the radial thickness at the plurality of recesses is less than the radial thickness at the outer diameter pedestals.

In another embodiment according to any of the previous embodiments, each recess is defined by a recess circumferential length and a recess axial width, each outer diameter pedestal is defined by an OD circumferential length and an OD axial width, each inner diameter pedestal is defined by an ID circumferential length and an ID axial width, and the recess circumferential length is greater than the OD circumferential length.

In another embodiment according to any of the previous embodiments, the OD axial width is the same as the recess axial width.

In another embodiment according to any of the previous embodiments, the ID axial width is greater than the OD axial width.

In another embodiment according to any of the previous embodiments, the recess circumferential length is greater than the ID circumferential length.

In another embodiment according to any of the previous embodiments, the plurality of outer diameter pedestals have a static structure abutment surface, and wherein the plurality of inner diameter pedestals have a bearing race abutment surface, and wherein the plurality of recesses are configured to receive a fluid.

In another featured embodiment, a gas turbine engine includes an engine static structure, at least one bearing supporting an engine shaft for rotation relative to the engine static structure, and a unified curved beam bearing damper positioned radially between the engine static structure and the at least one bearing. The unified curved beam bearing damper includes a ring that is a single-piece component having an outer peripheral surface and an inner peripheral surface that surrounds an engine center axis. A plurality of outer diameter pedestals are formed in the outer peripheral surface and are circumferentially spaced apart from each other. A plurality of inner diameter pedestals are formed in the inner peripheral surface and are circumferentially spaced apart from each other. A plurality of fluid recesses are formed in the outer peripheral surface and are circumferentially spaced apart from each other.

In another embodiment according to any of the previous embodiments, the plurality of fluid recesses alternate with the plurality of outer diameter pedestals circumferentially about the engine center axis.

In another embodiment according to any of the previous embodiments, the plurality of outer diameter pedestals are circumferentially offset from the plurality of inner diameter pedestals, In another embodiment according to any of the previous embodiments, each inner diameter pedestal is radially aligned with a corresponding one of the plurality of fluid recesses.

In another embodiment according to any of the previous embodiments, the ring has an axial width that extends from an upstream end to a downstream end, and including a first groove formed in the outer peripheral surface at the upstream end, a second groove formed in the outer peripheral surface at the downstream end, a first seal or piston ring in the first groove and a second seal or piston ring in the second groove.

In another embodiment according to any of the previous embodiments, the ring has a radial thickness extending from the inner peripheral surface to the outer peripheral surface, and wherein the radial thickness varies circumferentially about the engine center axis, and wherein the radial thickness at the plurality of fluid recesses is less than the radial thickness at the outer diameter pedestals.

In another embodiment according to any of the previous embodiments, each fluid recess is defined by a recess circumferential length and a recess axial width, each outer diameter pedestal is defined by an OD circumferential length and an OD axial width, each inner diameter pedestal is defined by an ID circumferential length and an ID axial width, and wherein the recess circumferential length is greater than the OD circumferential length, the OD axial width is the same as the recess axial width, the ID axial width is greater than the OD axial width, and/or the recess circumferential length is greater than the ID circumferential length.

These and other features may be best understood from the following drawings and specification.

DETAILED DESCRIPTION

Figure 1:
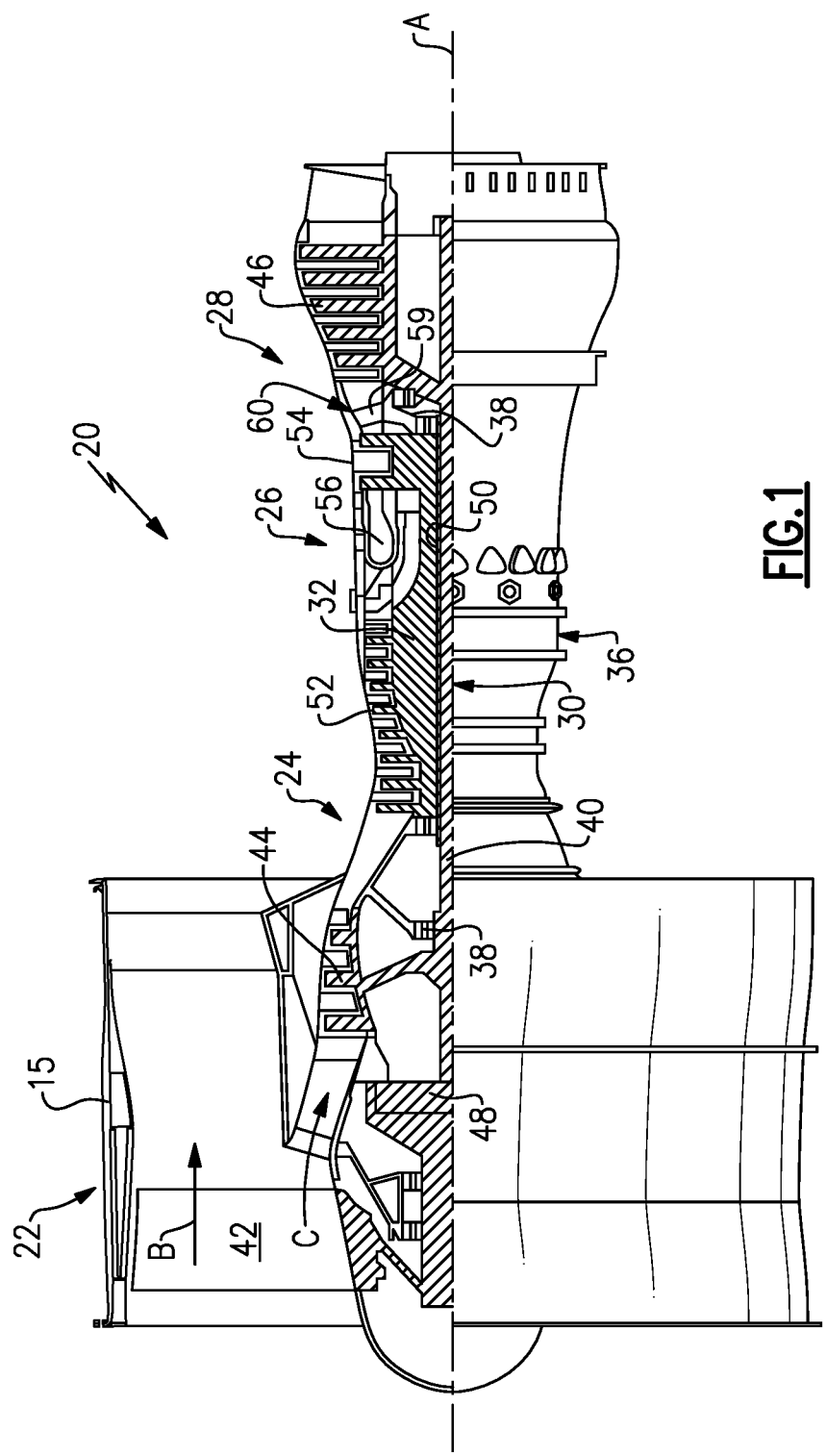
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a first (or low) pressure compressor 44 and a first (or low) pressure turbine 46. The inner shaft 40 is connected to a fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram °R)/(518.7°R)]$^{0.5}$. The "Low corrected fan tip speed" as disclosed herein according to one non-limiting embodiment is less than about 1150 ft/second (350.5 meters/second).

Figure 2:
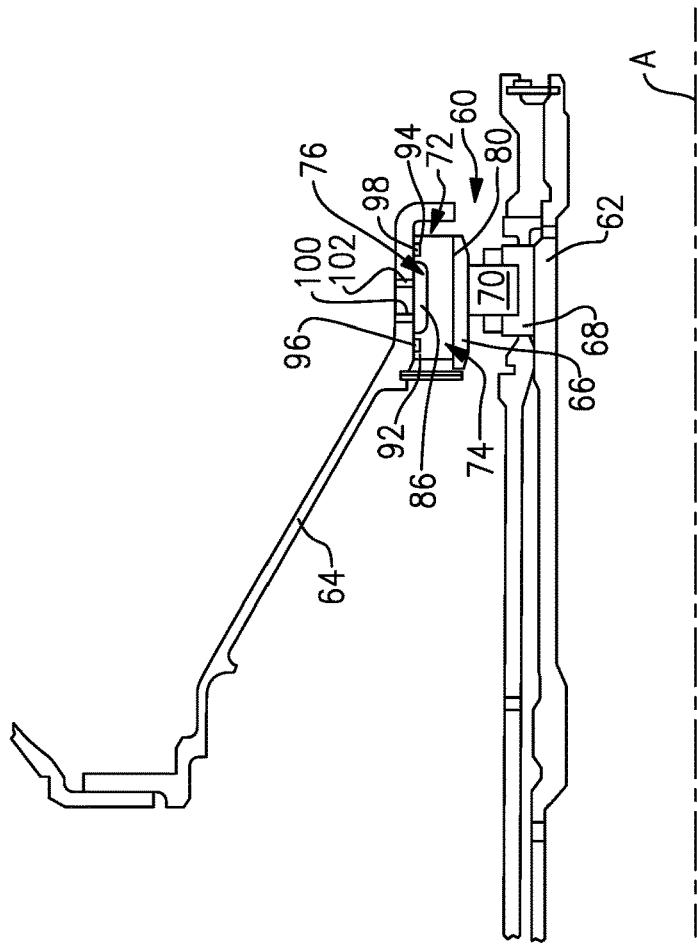
FIG. 2 is a section view of a single-piece curved beam damper as installed between a bearing and an engine static structure.

FIG. 2 shows an example of a curved beam bearing damper comprising a spring and damper that is combined into a single structure that provides support stiffness and damping to manage vibrations of associated rotating and static structures at specific engine operating speeds. At least one bearing 60 supports an engine shaft 62 for rotation relative to an engine static structure 64, such as a case structure, for example. The bearing 60 includes an outer race 66, an inner race 68, and one or more rolling elements 70 between the inner 68 and outer 66 races. The inner race 68 is fixed for rotation with the shaft 62 and the outer race is fixed to the engine static structure 64.

A unified curved beam bearing damper 72 is positioned radially between the engine static structure 64 and the outer race 66 of the bearing 60. The unified curved beam bearing damper 72 comprises a first portion comprising a curved beam ring 74 and a second portion that comprises an oil squeeze film damper 76. Both the curved beam ring 74 and the oil squeeze film damper 76 are integrally and unitarily formed as a monolithic/single-piece component.

Figure 3:
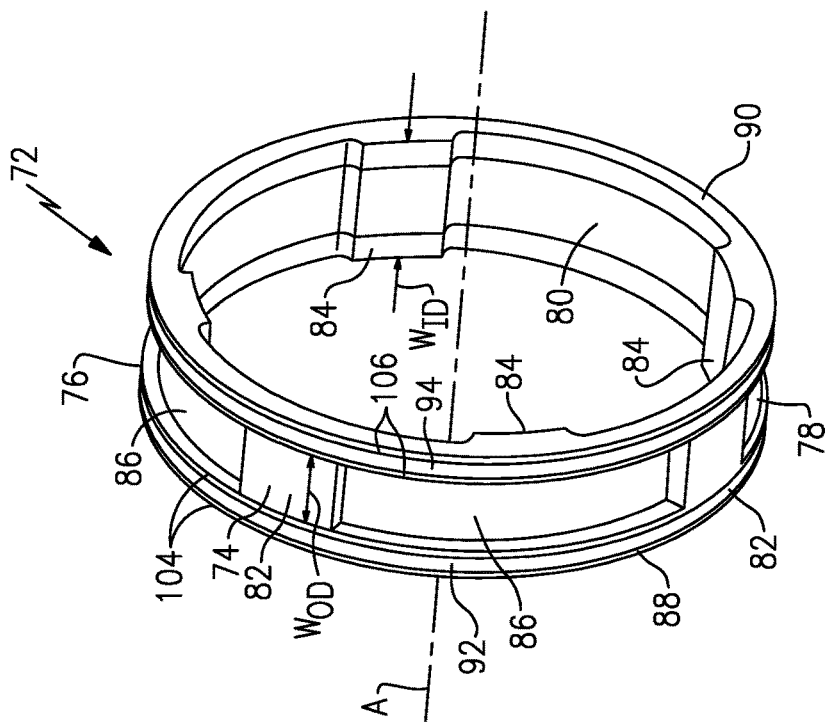
FIG. 3 is a perspective view of the curved beam damper of FIG. 2.
Figure 4:
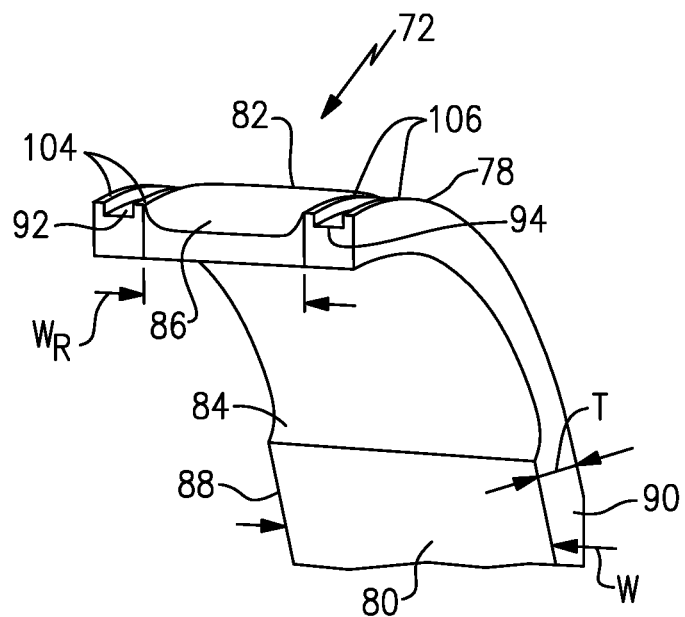
FIG. 4 is a perspective section view of the curved beam damper of FIG. 3.
Figure 5:
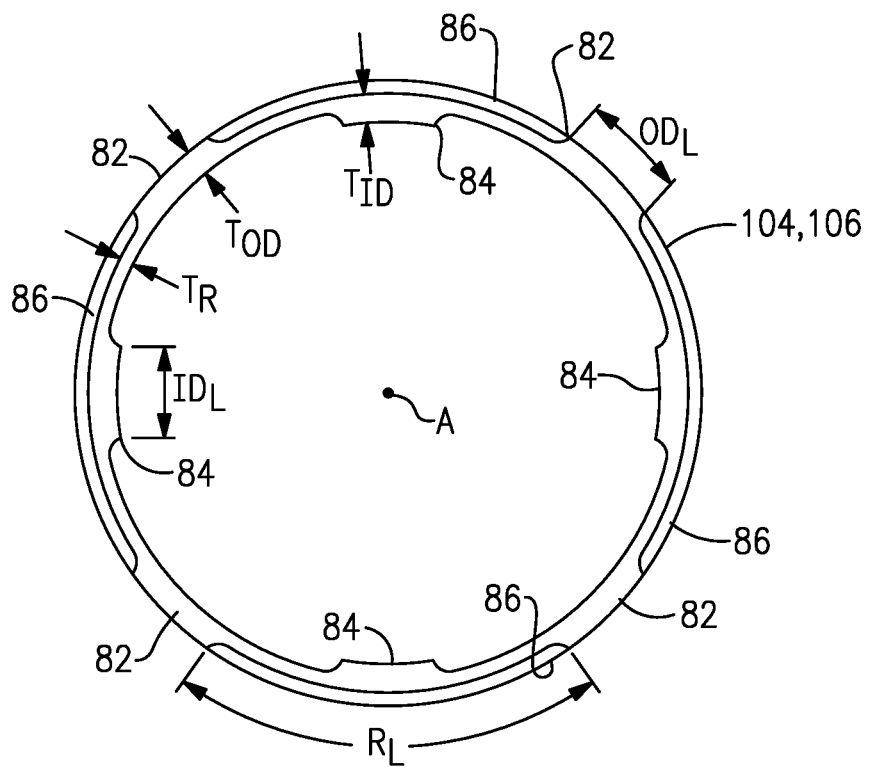
FIG. 5 is and end section view of the curved beam damper of FIG. 3.

The curved beam bearing damper 72 is shown in more detail in FIGS. 3-5. The curved beam bearing damper 72 has an outer peripheral surface 78 and an inner peripheral surface 80 that surrounds the engine center axis A. As shown in FIG. 2, at least a portion of the inner peripheral surface 80 of the curved beam bearing damper 72 is in direct abutting contact with an outer surface of the outer race 66 of the bearing 60. As shown in FIG. 3, the curved beam bearing damper 72 includes a plurality of outer diameter (OD) pedestals 82 that are formed in the outer peripheral surface 78, and which are circumferentially spaced apart from each other about the engine center axis A. The curved beam bearing damper 72 further includes a plurality of inner diameter (ID) pedestals 84 that are formed in the inner peripheral surface 80, and which are circumferentially spaced apart from each other about the engine center axis A. The curved beam bearing damper 72 also includes a plurality of fluid recesses 86 that are formed in the outer peripheral surface 60, and which are circumferentially spaced apart from each other about the engine center axis A. The plurality of fluid recesses 86 circumferentially alternate with the plurality of outer diameter pedestals 82 about the engine center axis A. As such, there is one fluid recess 86 between each adjacent pair of outer diameter pedestals 82.

In one example, the plurality of outer diameter pedestals 82 are circumferentially offset from the plurality of inner diameter pedestals 84 as shown in FIGS. 3 and 5.

In one example, each inner diameter pedestal 84 is radially aligned with a corresponding one of the plurality of fluid recesses 86 as shown in FIGS. 3 and 5. In one example, the each fluid recess 86 is radially aligned with a center portion of the associated fluid recess 86.

As shown in FIG. 4, the curved beam bearing damper 72 has an axial width W that extends from an upstream end 88 to a downstream end 90. A first groove 92 is formed in the outer peripheral surface 78 at the upstream end 88 and a second groove 94 is formed in the outer peripheral surface 78 at the downstream end 90. As shown in FIG. 2, a first seal or piston ring 96 is positioned within the first groove 92 and a second seal or piston ring 98 is positioned within the second groove 94.

As shown in FIG. 4, the curved beam bearing damper 72 has a radial thickness T extending from the inner peripheral surface 80 to the outer peripheral surface 78. The radial thickness T varies circumferentially about the engine center axis A. For example, as shown in FIG. 5, the radial thickness $T_R$ at the plurality of recesses 86 is less than the radial thickness TOD at the outer diameter pedestals 82. Also, for example, the radial thickness $T_R$ at the plurality of recesses 86 is less than the radial thickness TI at the inner diameter pedestals 84.

Each fluid recess 86 is defined by a recess circumferential length $R_L$ (FIG. 5) and a recess axial width $W_R$ (FIG. 4). Each outer diameter pedestal 82 is defined by an OD circumferential length $OD_L$ (FIG. 5) and an OD axial width $W_{OD}$ (FIG. 3). Each inner diameter pedestal 84 is defined by an ID circumferential length $ID_L$ (FIG. 5) and an ID axial width W (FIG. 3). In one example, the recess circumferential length $R_L$ is greater than the OD circumferential length $OD_L$. In one example, the OD axial width $W_{OD}$ is the same as the recess axial width $W_R$. In one example, the ID axial width W is greater than the OD axial width Won. In one example, the recess circumferential length $R_L$ is greater than the ID circumferential length $ID_L$.

Each of the dimensions of the curved beam bearing damper 72, e.g. circumferential length, axial width, radial thickness, etc., can be varied to provide a desired stiffness and/or or desired damping characteristics. As such, the curved beam bearing damper 72 is very customizable and easily tailored.

The plurality of outer diameter pedestals 82 have an outermost surface that comprises a static structure abutment surface. The plurality of inner diameter pedestals 84 have an innermost surface that comprises a bearing race abutment surface. The outer 82 and inner 84 diameter pedestals serve as spring structures to allow flexure in the radial direction to control stiffness and transfer load to the static structure. The plurality of recesses 86 are configured to receive a fluid, such as oil for example, and serve as an oil squeeze film damper. Each damper segment, e.g. fluid recess 86 can be configured to have its own fluid inlet 100 and its own fluid outlet 102 as shown in FIG. 2. Optionally, the recesses 86 could be connected together through small paths in the outer diameter pedestals 82 and have a common inlet 100 and common outlet 102.

In one example, there are four outer diameter pedestals 82, four inner diameter pedestals 84, and four recesses 86 as best shown in FIG. 5. The number of inner and outer pedestals, as well as the number of recesses could be varied as needed to provide the desired stiffness and damping. In this example, the four outer diameter pedestals 82 form four contact areas with the engine static structure 64 and the four inner diameter pedestals 84 form four contact areas with the bearing 60. The first groove 92 has a pair of shoulders 104 on opposite sides of the groove 92. The second groove 94 has a pair of shoulders 106 on opposite sides of the groove 94. These shoulders 104, 106 have a shoulder height defined in a radial direction. These shoulder heights are configured to limit the deflection of the overall system about the contact areas.

The subject disclosure provides a curved beam bearing damper comprising a spring and damper that is combined into a single ring structure that provides support stiffness and damping to manage vibrations of associated rotating and static structures. The ring structure offers the ability to tune stiffness by varying the number of pedestals along the inner and outer diameters and by varying the thicknesses, lengths, widths, etc. of the pedestals and/or recesses. Further, the integration of the recesses allows o-ring or piston ring sealing to provide the film damper chambers, which can be tuned to feed each other with oil, or have their own dedicated inlets and outlets. Unifying the ring, sealing, and effectiveness of the oil film damper saves weight, cost and packaging space as compared to traditional centering spring configurations. Further, as discussed above, multiple features on the unified curved beam can be tuned to obtain the desired ring stiffness for the overall system.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine component comprising:
   a ring comprising a single-piece component having an outer peripheral surface and an inner peripheral surface that surrounds an engine center axis;
   a plurality of outer diameter pedestals formed in the outer peripheral surface and circumferentially spaced apart from each other;
   a plurality of inner diameter pedestals formed in the inner peripheral surface and circumferentially spaced apart from each other; and
   a plurality of recesses formed in the outer peripheral surface and circumferentially spaced apart from each other.

2. The gas turbine engine component according to claim 1, wherein the plurality of recesses alternate with the plurality of outer diameter pedestals circumferentially about the engine center axis.

3. The gas turbine engine component according to claim 1, wherein the plurality of outer diameter pedestals are circumferentially offset from the plurality of inner diameter pedestals.

4. The gas turbine engine component according to claim 3, wherein each inner diameter pedestal is radially aligned with a corresponding one of the plurality of recesses.

5. The gas turbine engine component according to claim 1, wherein the ring has an axial width that extends from an upstream end to a downstream end, and including a first groove formed in the outer peripheral surface at the upstream end and a second groove formed in the outer peripheral surface at the downstream end.

6. The gas turbine engine component according to claim 5, including a first seal or piston ring in the first groove and a second seal or piston ring in the second groove.

7. The gas turbine engine component according to claim 1, wherein the ring has a radial thickness extending from the inner peripheral surface to the outer peripheral surface, and wherein the radial thickness varies circumferentially about the engine center axis.

8. The gas turbine engine component according to claim 7, wherein the radial thickness at the plurality of recesses is less than the radial thickness at the outer diameter pedestals.

9. The gas turbine engine component according to claim 1, wherein
   each recess is defined by a recess circumferential length and a recess axial width,
   each outer diameter pedestal is defined by an OD circumferential length and an OD axial width,
   each inner diameter pedestal is defined by an ID circumferential length and an ID axial width, and
   wherein the recess circumferential length is greater than the OD circumferential length.

10. The gas turbine engine component according to claim 9, wherein the OD axial width is the same as the recess axial width.

11. The gas turbine engine component according to claim 9, wherein the ID axial width is greater than the OD axial width.

12. The gas turbine engine component according to claim 9, wherein the recess circumferential length is greater than the ID circumferential length.

13. The gas turbine engine component according to claim 1, wherein the plurality of outer diameter pedestals have a static structure abutment surface, and wherein the plurality of inner diameter pedestals have a bearing race abutment surface, and wherein the plurality of recesses are configured to receive a fluid.

14. A gas turbine engine comprising:
   an engine static structure;
   at least one bearing supporting an engine shaft for rotation relative to the engine static structure; and
   a unified curved beam bearing damper positioned radially between the engine static structure and the at least one bearing, the unified curved beam bearing damper comprising a ring that is a single-piece component having an outer peripheral surface and an inner peripheral surface that surrounds an engine center axis, a plurality of outer diameter pedestals formed in the outer peripheral surface and circumferentially spaced apart from each other, a plurality of inner diameter pedestals formed in the inner peripheral surface and circumferentially spaced apart from each other, and a plurality of fluid recesses formed in the outer peripheral surface and circumferentially spaced apart from each other.

15. The gas turbine engine according to claim 14, wherein the plurality of fluid recesses alternate with the plurality of outer diameter pedestals circumferentially about the engine center axis.

16. The gas turbine engine according to claim 14, wherein the plurality of outer diameter pedestals are circumferentially offset from the plurality of inner diameter pedestals.

17. The gas turbine engine according to claim 14, wherein each inner diameter pedestal is radially aligned with a corresponding one of the plurality of fluid recesses.

18. The gas turbine engine according to claim 14, wherein the ring has an axial width that extends from an upstream end to a downstream end, and including a first groove formed in the outer peripheral surface at the upstream end, a second groove formed in the outer peripheral surface at the downstream end, a first seal or piston ring in the first groove and a second seal or piston ring in the second groove.

19. The gas turbine engine according to claim 14, wherein the ring has a radial thickness extending from the inner peripheral surface to the outer peripheral surface, and wherein the radial thickness varies circumferentially about the engine center axis, and wherein the radial thickness at the plurality of fluid recesses is less than the radial thickness at the outer diameter pedestals.

20. The gas turbine engine according to claim 14, wherein
each fluid recess is defined by a recess circumferential length and a recess axial width,
each outer diameter pedestal is defined by an OD circumferential length and an OD axial width,
each inner diameter pedestal is defined by an ID circumferential length and an ID axial width, and wherein
the recess circumferential length is greater than the OD circumferential length,
the OD axial width is the same as the recess axial width,
the ID axial width is greater than the OD axial width, and/or
the recess circumferential length is greater than the ID circumferential length.

* * * * *